United States Patent
Solberg et al.

(10) Patent No.: US 7,559,830 B2
(45) Date of Patent: Jul. 14, 2009

(54) DEVICE AND METHOD FOR CLEANING THE ABDOMINAL CAVITY IN FISH

(76) Inventors: Ronny Solberg, Ravenstølen 158, N-5171 Loddefjord (NO); Knut Inge Seim, Søre Titlestad 17, N-5243 Fana (NO)

( * ) Notice: Subject to any disclaimer, the term of this patent is extended or adjusted under 35 U.S.C. 154(b) by 283 days.

(21) Appl. No.: 10/586,040

(22) PCT Filed: Jan. 12, 2005

(86) PCT No.: PCT/NO2005/000015
§ 371 (c)(1), (2), (4) Date: Jul. 12, 2006

(87) PCT Pub. No.: WO2005/067724
PCT Pub. Date: Jul. 28, 2005

(65) Prior Publication Data
US 2008/0233852 A1 Sep. 25, 2008

(30) Foreign Application Priority Data
Jan. 13, 2004 (NO) .................................. 20040142
Oct. 27, 2004 (NO) .................................. 20044625

(51) Int. Cl.
*A22C 25/14* (2006.01)
(52) U.S. Cl. ...................................................... 452/121
(58) Field of Classification Search ......... 452/149–154, 452/160–163, 166, 170, 177, 180, 182, 183
See application file for complete search history.

(56) References Cited

U.S. PATENT DOCUMENTS

| | | | |
|---|---|---|---|
| 4,091,506 A | | 5/1978 | Soerensen et al. |
| 4,761,856 A | | 8/1988 | Ewing |
| 5,026,318 A | | 6/1991 | Jahnke |
| 5,980,376 A | * | 11/1999 | Grosseholz et al. ......... 452/116 |
| 7,179,163 B1 | * | 2/2007 | Vedsted et al. .............. 452/121 |

OTHER PUBLICATIONS

International Search Report mailed May 10, 2005 by the Swedish Patent Office (ISA) in counterpart international application No. PCT/NO 2005/000015.

* cited by examiner

*Primary Examiner*—Thomas Price
(74) *Attorney, Agent, or Firm*—Abelman, Frayne & Schwab

(57) ABSTRACT

The present invention concerns a device and method for fine cleaning of fish, where two tools working simultaneously and in opposite direction in the abdominal cavity of a gutted fish are employed.

10 Claims, 4 Drawing Sheets

DEVICE AND METHOD FOR CLEANING THE ABDOMINAL CAVITY IN FISH

The present invention concerns a device for cleaning the abdominal cavity in fish. The invention further concerns a method using the device according to the invention, and use thereof.

In fish industry, fish is gutted and the guts are removed by machines. To this day, no machine performing this operation satisfactory is available. For that reason, fish coming from the gutting process is fine cleaned manually in the last phase of the total cleaning process. That is, fish coming from the main cleaning machine, for instance on a transport belt, is manually fine cleaned by people standing alongside the transport belt, picking up fish, and fine cleaning the abdominal cavity, using hand tools such as for example vacuum tools, scraping tools, brushes, etc.

One disadvantage with this method is that the process is more expensive than necessary, since salary should be paid to a number of employees. If production is continued at night, this will cost extra salary. Further, there is the risk that production is stopped or slowed down when one or more of the employees are absent. Further, it occurs that the quality of the cleaned fish is not satisfactory, for example when an employee is tired, fed up with the job, or for other personal reasons.

Machines for gutting fish are known in the art. However, all machines require fine cleaning after the fish has been processed.

One such machine for gutting is amongst others described on Norwegian patent no. 172024. The machine described in this patent document is designed to cut up the fish from the anus to the area where the gill cavity is situated, to spread and open the abdominal cavity, to tear up the blood vessel(s), to collect and suck away the guts, and to tear off the eating organs in the oral cavity area, using amongst others vacuum tools.

Other machines are described in Norwegian patent application no. 2000 0711, and in Danish patent no. 153981B. These machines are also meant for the gutting of fish, and bring along the necessity of manual fine cleaning afterwards.

For the above mentioned reasons, amongst others, it is desirable that a technical solution for fine cleaning of fish is found, as a replacement of manual labour and the complications brought along by it.

The device and method according to the invention are in a machine that can be placed over existing transportation belts transporting gutted fish, or it can be incorporated in new systems.

The present invention is characterised by the characterising parts of the independent claims. Alternative embodiments are described in the dependent claims.

One preferred embodiment of the invention will now be described using the figures.

FIG. 1 is showing a device in accordance with the invention which is placed above a V-type transport belt.

FIG. 2 schematically shows a preferred embodiment of the invention.

Figure 1:
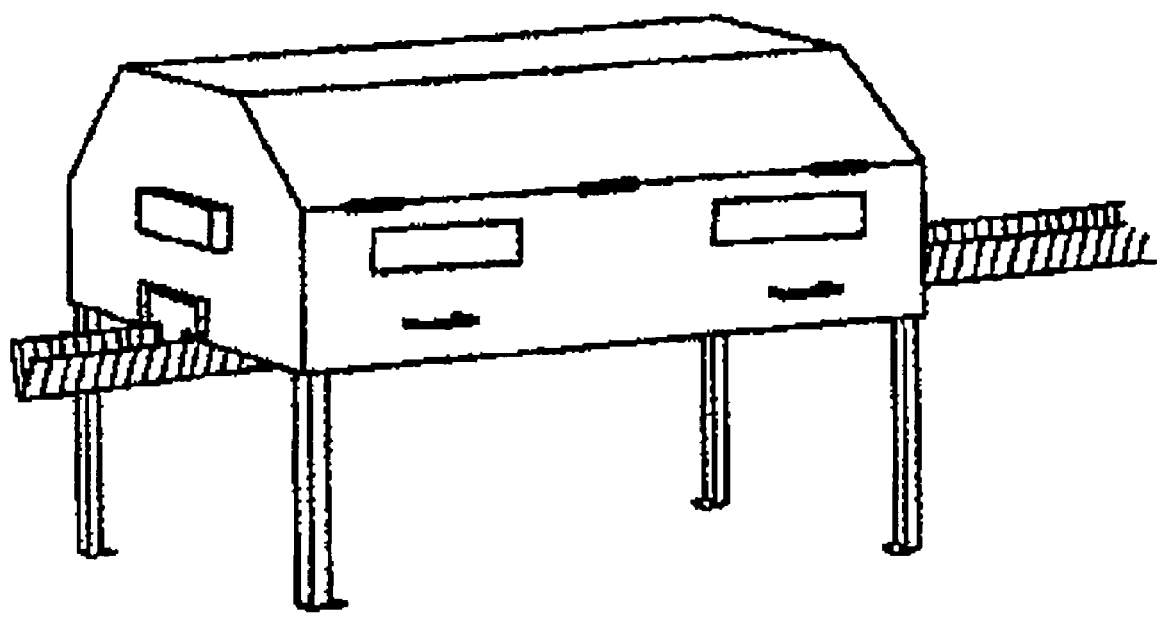

The device shown in FIG. 1 is an example of a device according to the invention, which is placed above an existing transportation belt. Before the use of the machine, one or more persons would be standing there, performing the fine cleaning manually.

Figure 2:
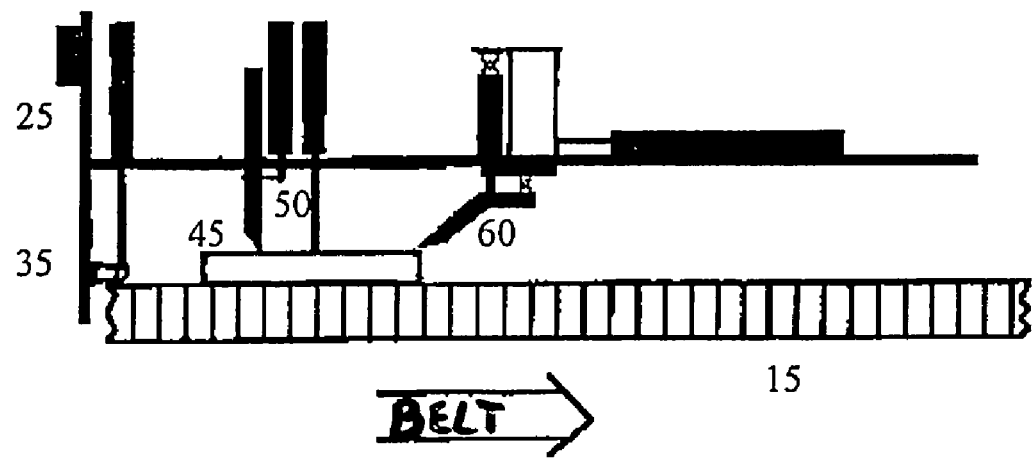
Figure 3:
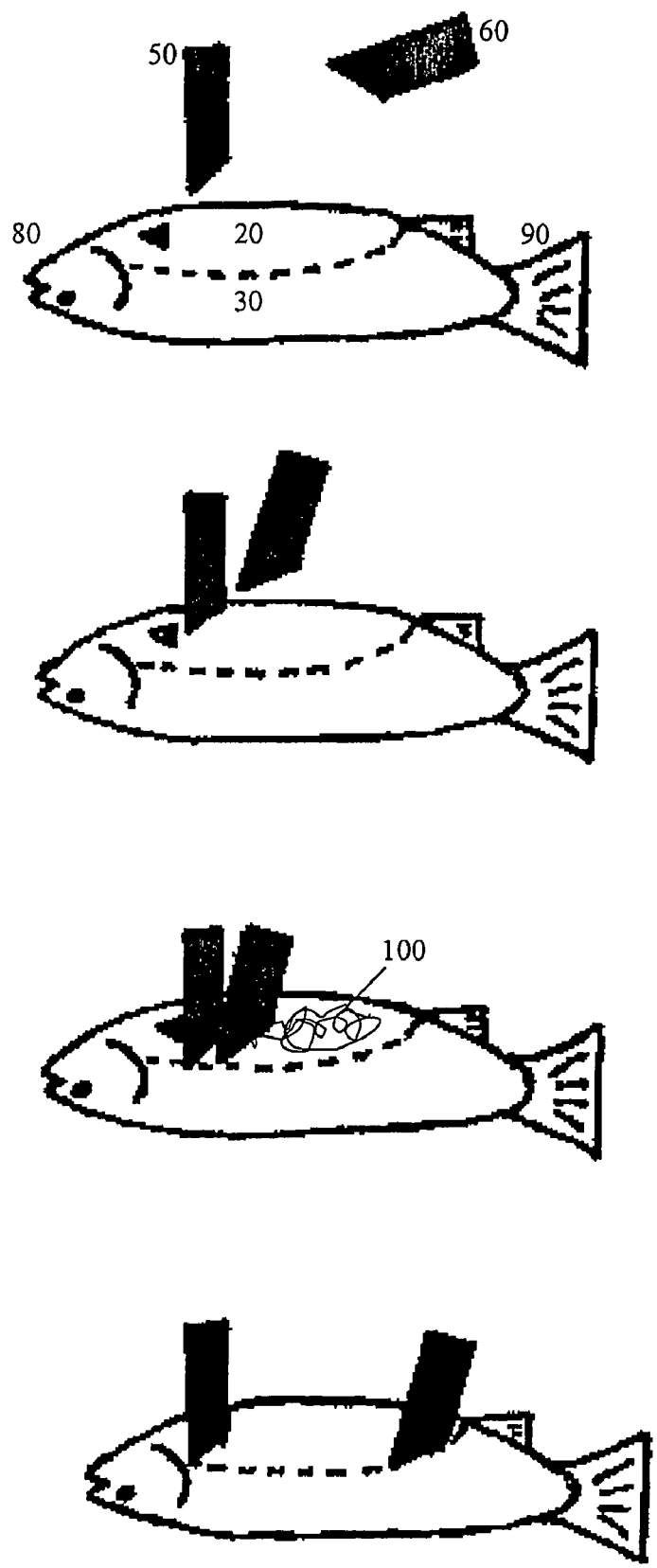
FIG. 3 shows the two most relevant parts of the system.
Figure 5:
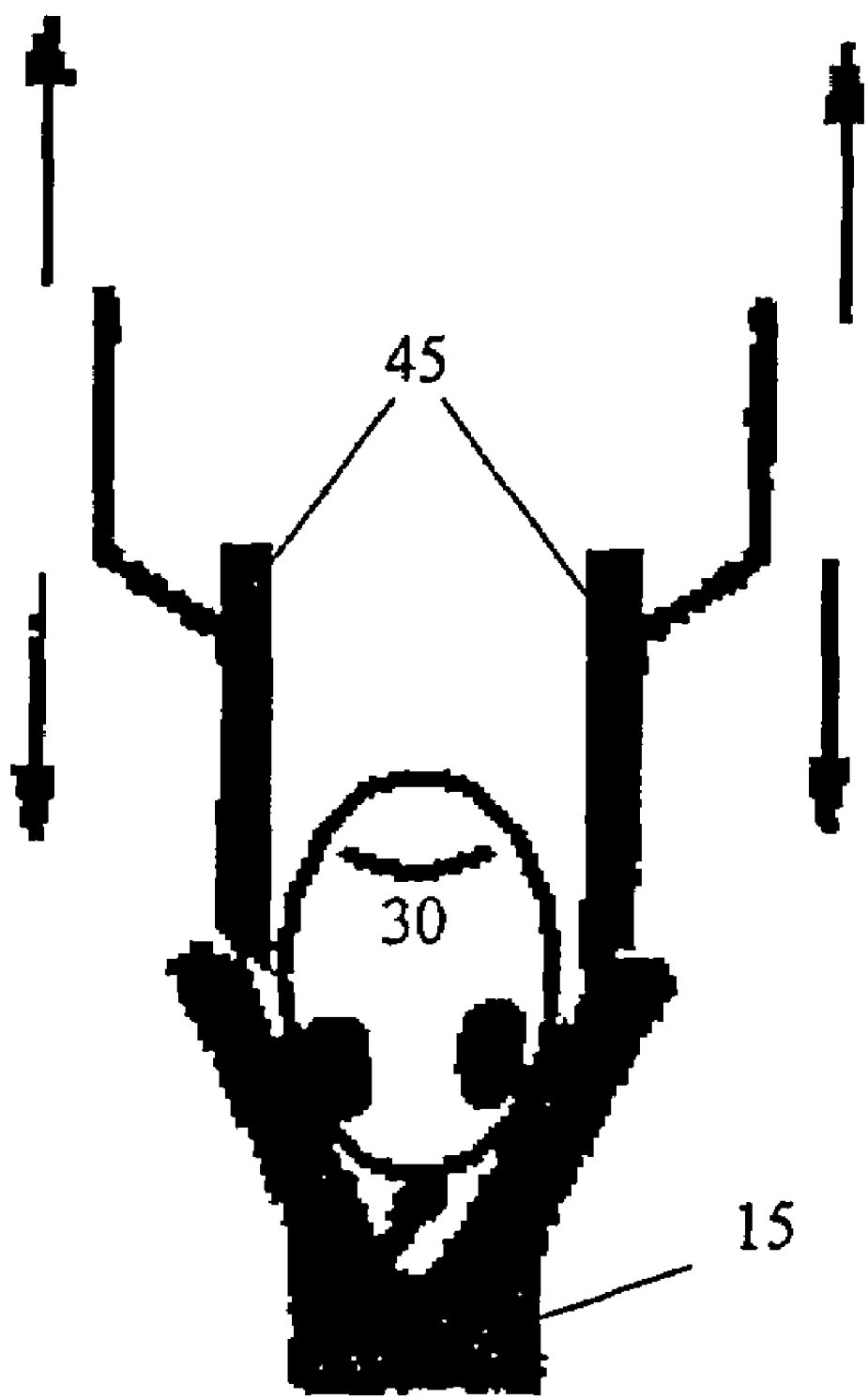
FIG. 5 shows a centring device in accordance with the invention.

In FIG. 2 the arrow indicates the moving direction of the belt. The fish is detected by sensor 25. Thereafter, the fish enters the machine with its tail first, through door 35. Two centring plates 45 centre the fish, without it being necessary that, in this embodiment of the device, the transportation belt 15 stops its movement. In FIG. 5 it is shown how the fish 30 is held between the centring plates 45. The cleaning tool 50, in this embodiment a vacuum tool, is lowered into the abdominal cavity 20 of the fish 30, close to the head 80 of the fish 30. Cleaning tool 60, in this embodiment a vacuum tool, is moved to the left, until it is situated right beside cleaning tool 50, and is also lowered into the abdominal cavity 20 of the fish 30. The cleaning tools are in this embodiment driven by pneumatic cylinders. Cleaning tool 60 moves to the right, whereby rests of guts, blood, and other rests 100 are scraped and sucked away. The cleaning tools are arranged in such a way that they follow the inside of the abdominal cavity 20 of the fish 30. Because of that cleaning tool 60 is drawing the fish to the right, to a certain extent, that is in the manner shown in FIG. 3, the head 80 of the fish 30 is automatically pressed against the cleaning tool 50, whereby all rests and impurities to be removed are reached. When this cycle is ready, the cleaning tool 60 can repeat its movement one or several times, for optimising cleaning of the abdominal cavity of the fish. When the result is satisfactory, the cleaning tools 50 and 60 are moved upward, and the fish follows the belt out of the machine. The next fish is on its way into the machine, and the cycle is repeated.

In FIG. 4, different examples of embodiments of vacuum tools usable in the device are shown. They are hollow, and have an opening to suck away unwanted elements. FIG. 4*a* shows a triangular cross section tube with a vacuum opening. In FIG. 4*b* an edge is added around the opening, the edge being capable of cutting or scraping, to render a more effective cleaning. In FIG. 4*c* and 4*d* an embodiment having a smaller opening is shown, where the rests are collected because of the slant front side of the vacuum tool. In FIG. 4*e*, slits are arranged in the sides of the tool, so that rests sticking to the sides of the abdominal cavity are sucked away. The groove can also cause the sides of the abdominal cavity to be sucked tightly against the cleaning tool. The tool in this embodiment is shaped like a stubby arrow keeping the fish in place, and keeping the fish open.

Cleaning tool 50 can have many different shapes and functions. As shown in FIG. 4*a* to 4*f*, the suction opening(s) can have different sizes and shapes, and they can be placed on different places on the tool. By varying the shape or size of the suction opening(s), the pressure, or more specific the under pressure, amongst others, is altered, and this can provide an easier removal of rests. The scraping effect is also varied by varying the pressure.

Figure 4A:
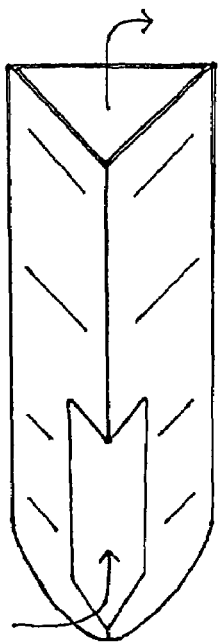
FIG. 4 shows examples of a vacuum tool.
Figure 4B:
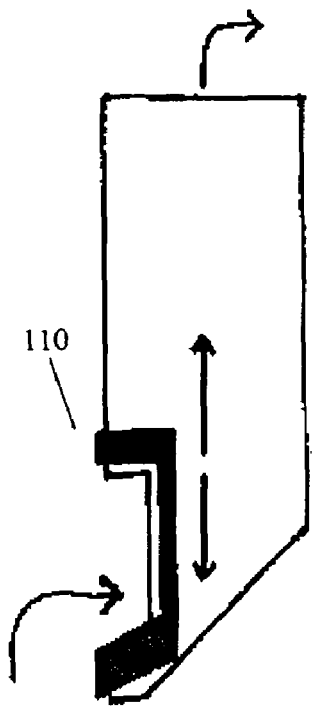
Figure 4C:
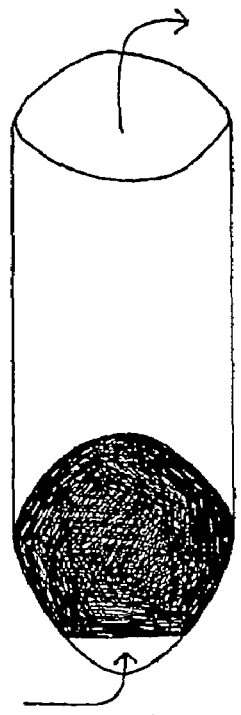
Figure 4D:
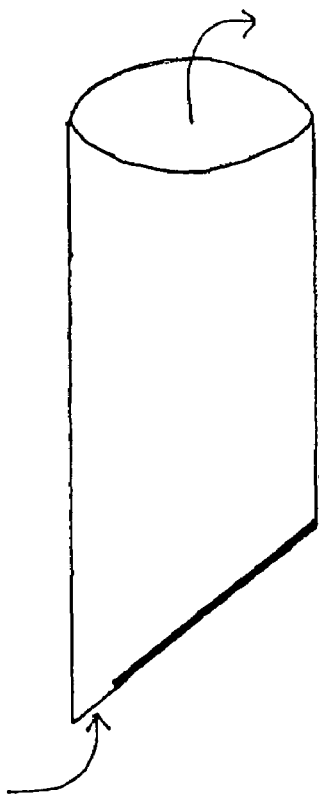
Figure 4E:

Moveable cutting means can be arranged on the tool, for example around the suction opening, as outlined in FIG. 4*b*. When the cutting means 110 is moved up and down, the dimension of the opening is varied, and rests are cut/carved away.

Figure 4F:
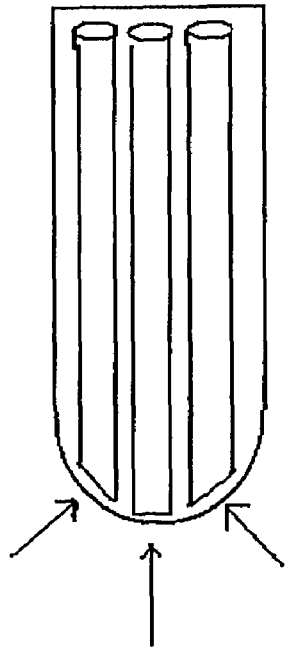

FIG. 4*f* shows an example of a cleaning tool built up of a plate comprising three vacuum tubes on it, where the outer two tubes are cut in an angle. In this manner, air is sucked in from different directions, and the effectiveness of the cleaning tool is improved.

The cleaning tools can have a scraping effect, sucking effect, brushing effect, or any other function which can be used to clean fish.

In FIG. 5, the two plates 45 for centering fish are shown. The fish is centered by that the two plates are lowered on each side of the fish. In another embodiment the plates are moving towards each other while moving down, for centering fish having different diameters. The plates can be moved simultaneously or independent of each other, dependent on the situation and embodiment of the machine they are used in.

Cleaning devices for fish are designed to be flexible in use, in respect of the types of tools which can be used, and future new types of tools.

Cleaning tools that are used in the invention today, and which after testing prove to be satisfactory effective, are equipped with controlled vacuum and scraping effect, so that the right pressure (moment) towards the abdominal cavity of the fish is obtained. The tools can be shaped in respect to the abdominal cavity of the fish, for example oval, with vacuum at the lower side, or at the sides of the tools, so that the vacuum can work towards the fish's abdominal cavity. This embodiment is a tube which is cut in an angle of 35 to 25 degrees, with a diameter of 40 to 60 mm.

The cleaning tools can also be triangularly shaped with a rectangle opening and in the same manner as the main tools shaped in respect to the fish's abdominal cavity at the lower end of the tool, so that it easily slips into the abdominal cavity of the fish.

The vacuum can work against the fish's head, where it is difficult to clean the fish. The tools can be controlled by a pressure (moment) against the abdominal cavity of the fish. The reason for the tool being triangularly shaped is because of that the triangular shape fits in the front side of the cut in the fish's belly, at the fish's head, and because of that it reaches a position tightly close to the head. However, other shapes can also be used, for example round, trapezoid, and other shapes.

Advantages with the tools in the test version of the device is that there is a constant vacuum against the head, which provides better cleaning than conventional types of cleaning tools for gutting. These conventional types are entered into the fish's abdominal cavity, and are removed so to say immediately after that. The tool 50 is working against the fish's head all the time while tool 60 completes its movements. The tools in accordance to the invention open the fish, centre the fish, keep the fish in place, and clean. Other functions can be provided by varying the embodiment of the tools.

Since the tools are lowered into the middle of the fish's abdominal cavity, and then moved towards the head and the tail, the invention is not dependent on that the tools meet the fish in any fixed point. In the prior art gutting devices, the tools must, for example, hit the fish exactly in the anus, something which complicates the whole process. With the present invention, it is not very important whether or not the fish is 100% centred or where exactly the fish is lying, as long as the tools end up in the abdominal cavity of the fish. The movement of the tools causes the fish to lie exactly where it should when the actual cleaning process is running. Further, the fish is cleaned more thoroughly, because of the opposite movement of the cleaning tools.

Cutting tools can also be arranged on the cleaning tools, in front of the vacuum, so that any unwanted elements clung to the fish are cut loose.

The device has been tested with great success. It has been tested without fish over large periods of time to determine whether or not the machine is stable in its cycle. With fish, a large number of tools where tested in order to gain experience regarding what would be possible and what can be excluded.

Rotating knives, brushes, and a large number of vacuum and scraping tools where tested. The tools which were preferred under testing are the vacuum tools shown in FIG. 4. However, it can be looked into which tools render the best result.

The tool 50 is standing still in the test version of the invention. However, embodiments where tool 50 is moving can be constructed.

While testing the invention it was found out that it is advantageous to add water during the cleaning process, as this increases the friction between the tools and the substances to be cleaned. Presumably, this is caused by that mucous in the fish is removed or at least diluted by the water.

Further, additional tools or devices can be arranged on the cleaning tools, or in combination with them. Examples can be additional vacuum tools, hooks to keep the abdominal cavity opened, etc.

The device according to the invention has been tested with and without fish, and using the previously described tools. The device performs a more satisfactory job than with manual cleaning. Apart from the economic advantages, the obtained result is consequently more satisfactory, and of more constant quality.

In the device, the equipment can be mounted onto a plate over the tools, said plate also function as a barrier between wet and dry zones, so that all electricity, and most of the technical equipment, can be placed in the dry zone over the plate.

The control can be a Programmable Logic Controller (PLC) and pneumatic controls, hydraulic, electric, and so on. Common for all types of control should be that the force and pressure exerted on the fish should be controlled, so that the fish is not unnecessarily damaged or torn up, while at the same time the pressure is large enough to obtain a scraping effect.

The invention claimed is:

1. Device (1) for cleaning of the abdominal cavity (20) in fish (30), comprising:
   transport mechanism(s) for introduction of the fish (30) into the device (1);
   means for detection of when the fish (30) enters the device (1);
   controls for controlling the method executed in the device (1); and
   actuators for providing movement of the moveable parts in the device (1), wherein the device (1) further comprises a first cleaning tool (50) and a second cleaning tool (60), said cleaning tools (50, 60) being arranged to follow the inside of the abdominal cavity and to move in opposite directions from each other, after introduction in the abdominal cavity (20) of the fish (30).

2. Device in accordance with claim 1, wherein the cleaning tools are vacuum tools, scraping tools, brushing tools, spraying tools, or other tools suitable for cleaning the abdominal cavity in fish.

3. Device in accordance with claim 2, wherein one or both cleaning tools (50, 60) are provided with a system enabling the cleaning tools to follow the inside of the abdominal cavity of the fish (30) with a desired pressure.

4. Device in accordance with claim 3, wherein the system is mechanical, hydraulic, pneumatic, or electric.

5. Device in accordance with claim 4, wherein one or both cleaning tools (50, 60) are shaped in respect to the abdominal cavity of the fish; having one or more openings for sucking up loose elements; and having a scraping effect for loosening of unwanted elements.

6. Device in accordance with claim 5, wherein the device further comprises a number of additional tools on, or in addition to, the cleaning tools.

7. Device in accordance with claim 6, wherein the device is provided as a module for placement over an existing production line with a V-type belt, a flat belt, rollers, or the like; or that it is provided as a module for placement between two parts of the production line, where the device comprises an incorporated V-type belt, a flat belt, rollers, or the like.

8. Device in accordance with claim 7, wherein the device comprises a means for centering of fish, said means comprising two plates (45) which move down on the sides of the fish (30), and which can hold the fish (30) in its place by the plates (45) moving towards each other at the same time that they move down on the sides of the fish (30).

9. Method for cleaning the abdominal cavity (20) in fish, using the device in accordance with claim 1, wherein the method comprises the following steps:
   a. introducing and centering a fish (30) in position under the first cleaning tool (50), with the tail in the direction of the movement;
   b. lowering the first cleaning tool (50) into the abdominal cavity (20) of the fish (30), close to the head (80);
   c. lowering the second cleaning tool (60) into the abdominal cavity (20) of the fish (30), next to the first cleaning tool (50), with the first cleaning tool (50) positioned between the fish's head (80) and the second cleaning tool (60);
   d. moving the second cleaning tool (60) in the direction of the tail (90) of the fish (30), whereby guts, organs, or leavings thereof (100) are cleaned away, and whereby the head (80) of the fish (30) is drawn completely against the first cleaning tool (50), and where one or both of the cleaning tool (50, 60) follow the shape of the abdominal cavity of the fish;
   e. possibly and if needed repeating step d; and
   f. lifting the first and the second cleaning tool (50, 60) out of the abdominal cavity (20) of the fish (30), whereby the fish (30) is released, and whereby the device is ready for the next cycle of the method.

10. Method for cleaning the abdominal cavity of a fish, comprising the steps of:
   a) taking a device which comprises,
      i) transport mechanism(s) for introduction of the fish (30) into the device (1);
      ii) means for detection of when the fish (30) enters the device (1);
      iii) controls for controlling the method executed in the device (1); and
      iv) actuators for providing movement of the moveable parts in the device (1), wherein the device (1) further comprises a first cleaning tool (50) and a second cleaning tool (60), said cleaning tools (50, 60) being arranged to follow the inside of the abdominal cavity and to move in opposite directions from each other, after introduction in the abdominal cavity (20) of the fish (30);
   b) introducing and centering a fish (30) in position under the first cleaning tool (50), with the tail in the direction of the movement;
   c) lowering the first cleaning tool (50) into the abdominal cavity (20) of the fish (30), close to the head (80);
   d) lowering the second cleaning tool (60) into the abdominal cavity (20) of the fish (30), next to the first cleaning tool (50), with the first cleaning tool (50) positioned between the fish's head (80) and the second cleaning tool (60);
   e) moving the second cleaning tool (60) in the direction of the tail (90) of the fish (30), whereby guts, organs, or leavings thereof (100) are cleaned away, and whereby the head (80) of the fish (30) is drawn completely against the first cleaning tool (50), and where one or both of the cleaning tool (50, 60) follow the shape of the abdominal cavity of the fish;
   f) possibly and if needed repeating step d; and
   g) lifting the first and the second cleaning tool (50, 60) out of the abdominal cavity (20) of the fish (30), whereby the fish (30) is released, and whereby the device is ready for the next cycle of the method.

* * * * *